United States Patent
Elomäki et al.

(10) Patent No.: US 7,445,811 B2
(45) Date of Patent: Nov. 4, 2008

(54) METHOD AND ARRANGEMENT IN COATING LINE FOR FIBRE-LIKE PRODUCT OR PRODUCTS

(75) Inventors: Kari Elomäki, Vantaa (FI); Mikko Lahti, Järvenpää (FI); Risto Leskinen, Espoo (FI); Jari Sauranen, Vantaa (FI); Paavo Veijanen, Helsinski (FI)

(73) Assignee: Nextrom Oy, Vantaa (FI)

( * ) Notice: Subject to any disclaimer, the term of this patent is extended or adjusted under 35 U.S.C. 154(b) by 837 days.

(21) Appl. No.: 10/522,550

(22) PCT Filed: May 24, 2004

(86) PCT No.: PCT/FI2004/000313

§ 371 (c)(1),
(2), (4) Date: Feb. 3, 2005

(87) PCT Pub. No.: WO2004/106202

PCT Pub. Date: Dec. 9, 2004

(65) Prior Publication Data

US 2005/0206021 A1    Sep. 22, 2005

(30) Foreign Application Priority Data

May 27, 2003  (FI) .................................. 20030800

(51) Int. Cl.
*B05D 5/06* (2006.01)
(52) U.S. Cl. .................... 427/163.2; 427/162; 427/165; 118/672; 118/503; 118/123
(58) Field of Classification Search ................. 427/162, 427/163.2, 112, 655; 118/672, 503, 123
See application file for complete search history.

(56) References Cited

U.S. PATENT DOCUMENTS

| 4,917,285 A | 4/1990 | Shosie |
| 5,505,398 A | 4/1996 | Emmerich |
| 5,594,822 A | 1/1997 | Berkey |
| 5,881,189 A | 3/1999 | Carberry et al. |
| 6,534,122 B1 | 3/2003 | Nykanen et al. |
| 7,226,638 B2 * | 6/2007 | Kekkonen et al. ........... 427/162 |

FOREIGN PATENT DOCUMENTS

| DE | 3703011 A1 | 8/1988 |
| WO | WO 99/65836 A2 | 12/1999 |

* cited by examiner

*Primary Examiner*—Alain L Bashore
(74) *Attorney, Agent, or Firm*—Oliff & Berridge, PLC

(57) ABSTRACT

A method and an arrangement in a coating line for a fibre-like product or fibre-like products, in which the fibre-like product is directed from output means to a press head, by means of which a tube is formed around the fibre-like product. The fibre-like product is directed from the coating line to a feed unit in a preparatory position at the side. When the coating process of a previous product has terminated, the feed unit is shifted to the coating line and the fibre-like product is fed into the press head and is accelerated to the speed of the tube by means of the feed unit. The feed unit is detached from the fibre-like product, when measurement parameters associated with the fibre-like product and/or the tube reach the predetermined values and is shifted back to the preparatory position at the side of the coating line.

12 Claims, 3 Drawing Sheets

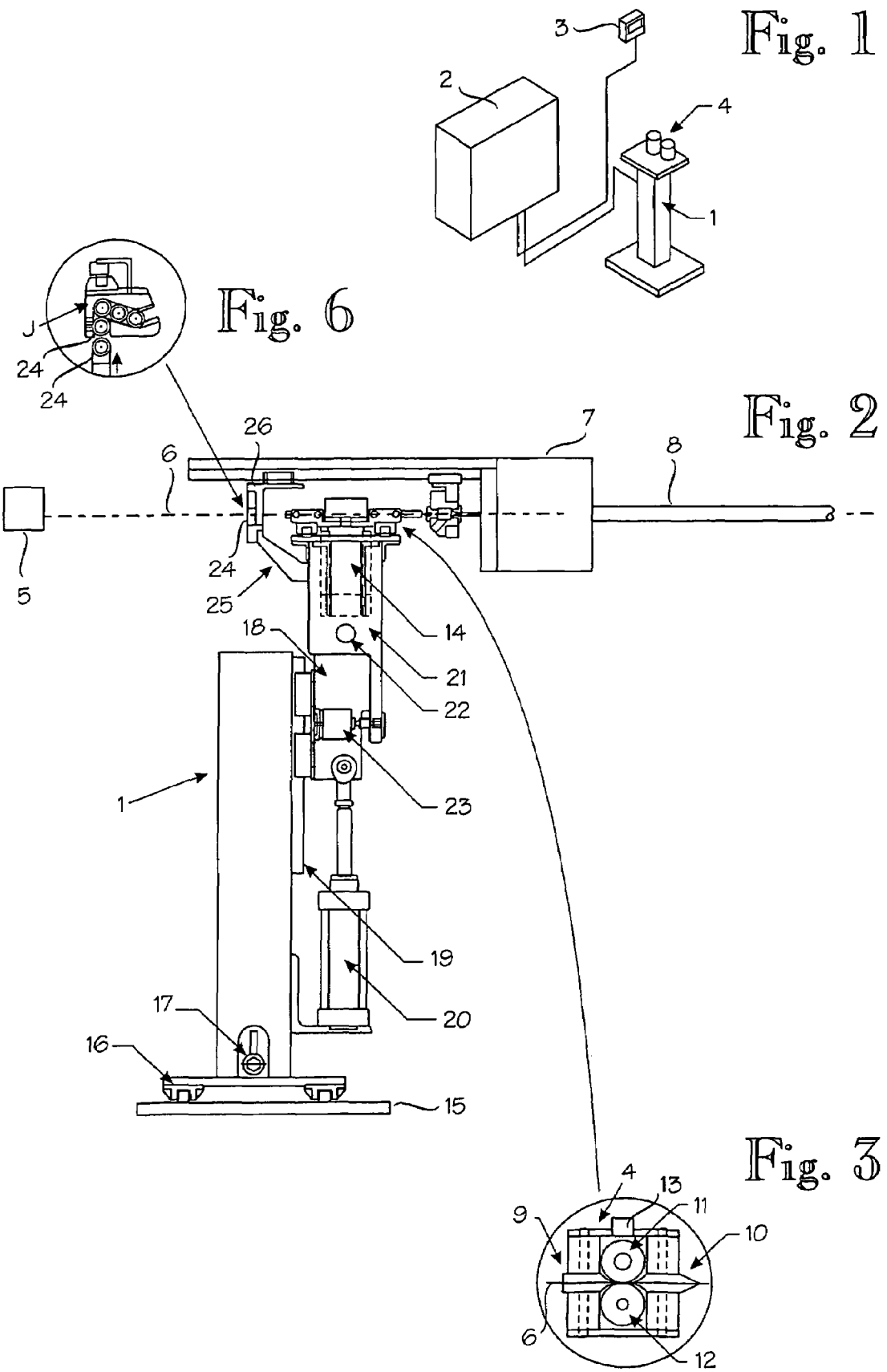

Figure 4A:
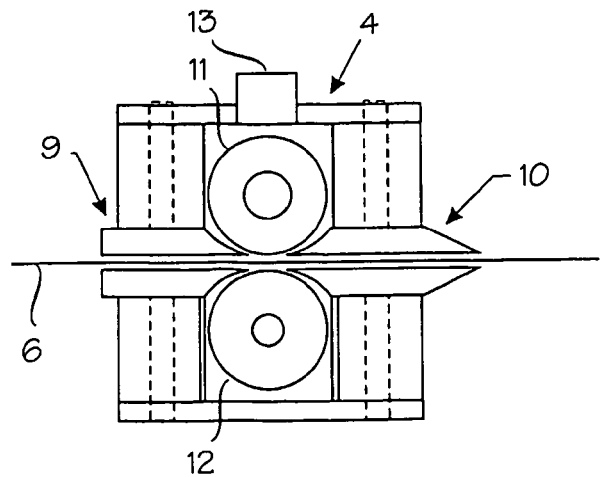

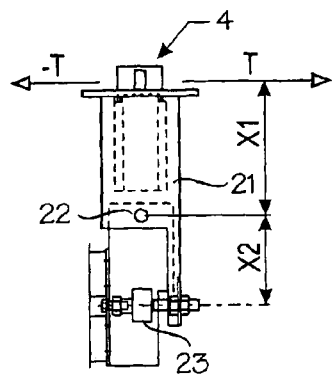
Fig. 5
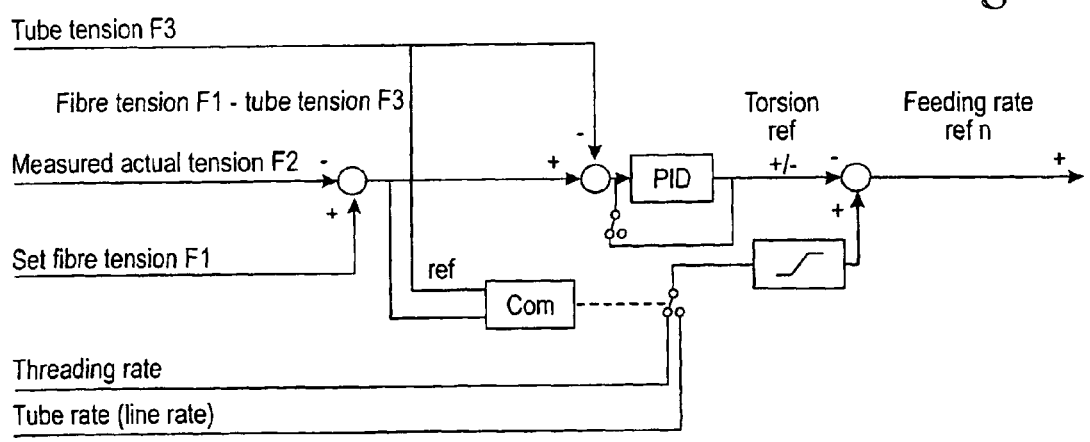
Fig. 7
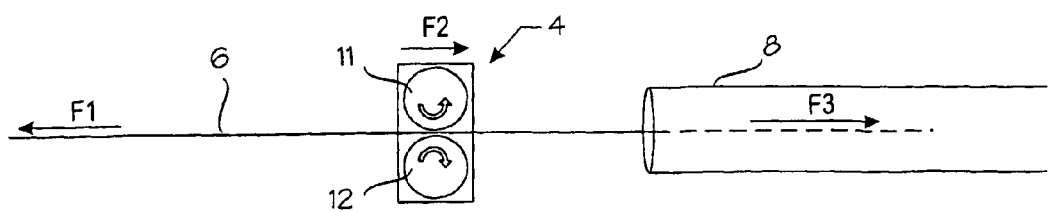

METHOD AND ARRANGEMENT IN COATING LINE FOR FIBRE-LIKE PRODUCT OR PRODUCTS

The invention relates to a method in a coating line for a fibre-like product or fibre-like products, especially for an optical fibre or optical fibres, in which the fibre-like product and products are directed from output means to a press head, by means of which a tube is formed around the fibre-like product or the fibre-like products. The invention also relates to an arrangement in a coating line for a fibre-like product or fibre-like products.

Technique of the type mentioned above is, used for instance in a secondary coating line for optical fibres. In connection with the prior art technique new fibres are threaded manually onto the press head after the fibres of the previous coating process have come to an end. Such a method is technically a completely functional method. However, what becomes a problem is that the line has occasionally even had to be stopped before the threading of a new fibre or new fibres has become possible. Consequently, breaks have occurred in production, which in turn has increased the costs.

Previously production lines have also been developed provided with two sets of fibre outputs so as to allow tuning new fibres in the outputs while the previous ones are still running. A problem in such solutions is that the fibre cutter has been reeled back when the fibres are depleted and only thereafter it has become possible to thread new fibres into the cutter through the press head and further into the tube while the line speed has been so low that the threading performed manually has been possible.

The drawback of all previously known solutions has therefore been the fact that the coating line has had to be stopped or at least the line speed has had to be significantly reduced before feeding new fibres manually has been possible. Feeding new fibres manually has therefore resulted in production delays. In addition, the feeding process performed manually is a very difficult working phase and in some cases also a factor affecting the safety at work.

It is an object of the invention to provide a method and an arrangement, by which the drawbacks of the prior art can be eliminated. This object is achieved by means of the method and the arrangement according to the invention. The method of the invention is characterized in that the fibre-like product or the fibre-like products are directed from the coating line functioning in the coating process of a previous product or products to a feed unit in a preparatory position at the side, when the coating process of the previous product or products has terminated the feed unit is shifted to the coating line and the fibre-like product or the fibre-like products are fed into the press head and are accelerated to the speed of the tube by means of the feed unit, and the feed unit is detached from the fibre-like product or the fibre-like products, when measurement parameters associated with the fibre-like product or the fibre-like products and/or the tube reach the predetermined values and are shifted back to the preparatory position at the side of the coating line. The arrangement according to the invention is in turn characterized in that the arrangement comprises a feed unit provided with a motor-driven roller device and a guide nozzle for the fibre-like product or the fibre-like products arranged to shift from a preparatory position at the side of the coating line to a feeding position on the coating line and back to feed the fibre-like product or the fibre-like products into the press head after the termination of the previous coating process, and measuring means for measuring measurement parameters associated with the fibre-like product or the fibre-like products to control the feed unit.

The invention provides such an advantage that threading of new fibres occurs automatically, and therefore the operator need not participate in the start and will not affect the success of the threading, in which case the safety at work also improves. Another advantage is that the line speed does not have to be reduced when new fibres are fed, but the feed can be carried out even during a high line speed. A further advantage is that since the fibres are accelerated in a controlled way to the speed of the tube, then at the same time a tension pull is avoided when the fibres are stuck into the tube. Still another advantage is obtained in that the preparation occurs while the previous fibres are still running, and therefore the ratio between the production time and the downtime improves in comparison with the prior art.

Figure 4B:
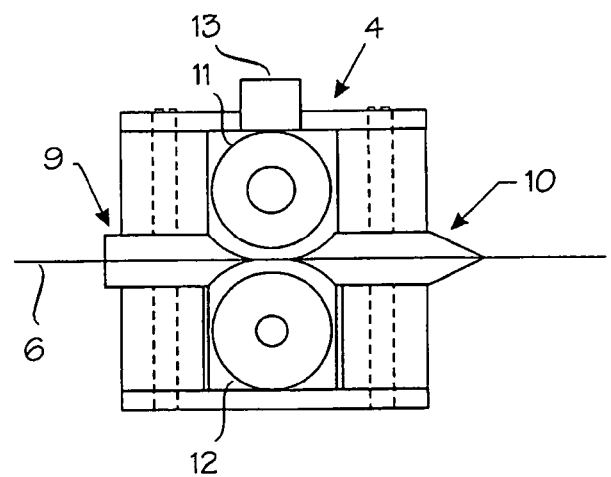
Figure 4C:
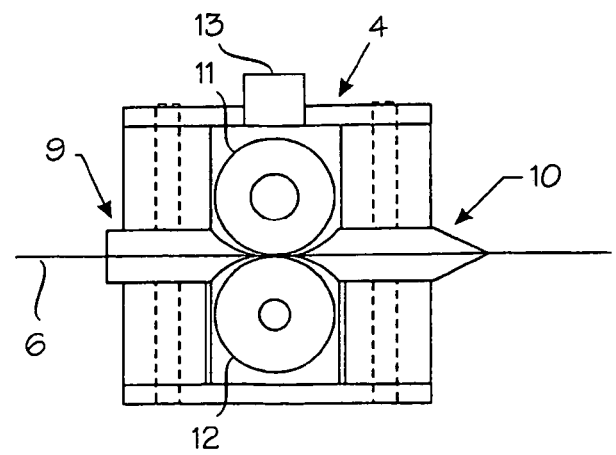

In the following the invention will be explained in greater detail by means of an embodiment described in the accompanying drawing, in which FIG. 1 schematically shows the main parts of an arrangement according to the invention, FIG. 2 is a side view showing the arrangement of the invention arranged in a coating line of fibres, FIG. 3 is a top view showing a detail of the arrangement of the invention, FIGS. 4a to 4c illustrate the operation of the detail shown in FIG. 3 in stages, FIG. 5 schematically shows a second detail of a device according to the invention and the operational principle thereof, FIG. 6 shows a third detail of the device according to the invention, and FIG. 7 schematically shows the principle of tension control.

FIG. 1 schematically shows the main parts of an arrangement according to the invention. Reference numeral 1 indicates a feed unit, reference numeral 2 indicates a control box and reference numeral 3 indicates a control panel. The feed unit can be formed for instance of a frame made of a tubular beam or tubular beams, on which components are attached. The feed of a fibre-like product or fibre-like products takes place by means of a motor-driven roller device 4. The operations are controlled using logic placed in the control box 2. The control panel 3 provides the product to be run with suitable control parameters.

The term fibre-like product or fibre-like products refer in this context to all elongated flexible products that behave for instance like optical fibres during the feeding process.

FIG. 2 shows the arrangement according to the invention in connection with a coating process of optical fibres. In FIG. 2, reference numeral 5 indicates output means of the fibres and reference numeral 6 indicates fibres. The number of fibres may be one or more. Reference numeral 7 refers in FIG. 2 to a press head, by means of which a tube 8 is formed around the fibres 6.

A motor-driven roller device 4 comprises control tubes 9 and 10 to be split that guide the fibres on rolls 11 and 12 and from the rolls to a fibre needle in the press head 7. When opened, the rolls 11 and 12 and the control tubes 9 and 10 allow shifting the feed unit from the thread line and the threading of the fibres. When closed, the rolls receive the tension set in the output means of the fibres, and during threading feed the fibres through the needles/the press head and accelerate them to the line speed. In order facilitate the threading of the fibres the rolls 11 and 12 are closed in stages as shown in FIGS. 4a to 4c. Closing takes place in the following order, first the control tubes and then the rolls. Opening takes place in the reverse order. The rolls 11 and 12 as well as the control tubes 9 and 10 are moved for instance using a pneumatic actuator 13. One of the rolls is rotated by means of a motor 14.

The frame pillar of the feed unit 1 is arranged in the example shown in the figure to move in the transverse horizontal direction in relation to the thread line on a bottom plate 15 fastened to the floor on rails 16 moved by a cylinder 17. An actual control part 18 arranged on a moving frame part is arranged to ascend and descend on rails 19 by means of an actuator 20 such as a cylinder means.

A swinging frame part 21 is fastened using a joint 22 to the movable frame part 18 and a force sensor 23 is mounted between the aforementioned parts, the force sensor measuring the force of the fibres acting on the feed rolls. The principle of force measurement is described separately in FIG. 5.

When run, the fibres 6 move some twenty centimetres before arriving at the press head through a guide nozzle 24. During preparation, in other words when the feed unit is in the preparatory position at the side of the coating line (thread line), the fibres are threaded through a new guide nozzle that is placed into a holder 25 in the threading device. The holder 25 is fastened to the movable frame part 17. When the threading device moves from the preparatory position to the feeding position, the threaded guide nozzle is pushed into a cassette 26 attached to the press head, replaces the guide nozzle used by the previous fibre and takes the place thereof. This detail is shown in FIG. 6.

The components required by the actuators and the motor of the arrangement according to the invention are placed in the control box 2. The logic handles the control and adjustment of the device. The device is provided with a specific control panel 3 intended for use and set-up of control parameters. The start of automatic threading, the control of a grease pump during threading and the line speed and the shift of fibre tension data to the device can be implemented by switching the logic of the device through the line to the line control logic.

The arrangement according to the invention basically operates as follows. Reels are placed into the output means 5 of the fibres, i.e. the fibre outputs, and the fibre ends are pulled on a threading device, i.e. the feed means 1. The fibre ends 1 are threaded through a guide nozzle 24 and are placed into an open jaw of the roller device 4, shown in FIG. 4a. Then the control tubes 9, 10 and rolls 11, 12 are closed as shown in FIGS. 4b and 4c. Pressing a button on the control panel 3 carries out the operation mentioned above. The fibre ends are cut to the same level as the feed tube. When the object is to perform threading automatically when the previous fibres are depleted, the automatic start is selected on the control panel.

The automatic operation takes place in the following fashion when the first control alternative is used. The start of the feed takes place either as an indication of the depletion of the fibres on the line or by pressing the start button on the control panel 3. The depletion of the fibres can be achieved also by cutting the fibres using a cutter. The use of the start button comes up if for instance the colour change occurring in the tube requires a waiting, period. The feed unit moves from the preparatory position below the thread line and rises up to the line, whereby a new guide nozzle 24 threaded into the fibres pushes away the guide nozzle used and replaces said guide nozzle in the holder. This operation is shown in FIG. 5. The rolls 11, 12 rotate at creeping speed while feeding the fibres through the press head 7. A grease pump providing the tube 8 with grease is initiated and the grease flow starts to pull the fibre ends. The rolls 11, 12 continue to rotate at creeping speed until the tension caused by the draught of the tube 8 in the rolls reaches the set value. The tube tension control of the feed of the fibres is then switched on and the rolls 11, 12 accelerate the speed of the fibres 6 to the line speed while the controller keeps the tension of the tube constant. The rolls 11, 12 and the control tubes 9, 10 are opened when a particular length of fibres have been fed into the tube. Such a length may refer for instance to the distance from the press head around the mid-capstan of the line. The tension control of the tube is switched off when the rolls come to a stop and the feed unit returns to the preparatory position.

The above described tension control of the tubes is schematically shown in FIG. 7. The line requires two fibre output sets, one of which being run and the other can be prepared during the run. A fibre cutter is arranged so that it is placed at the side of the line of the operable fibres and captures the fibres into the jaw thereof when being cut. Thus, the new fibres can be fed onto the line immediately after being cut and the cutter can be reeled back when the new fibres are already running.

If the second control alternative is used, the start of the feed takes place as an indication of the depletion of the fibres on the line or by pressing the start button on the control panel 3. The feed unit 1 moves from the preparatory position below the thread line and rises up to the line, when the new guide nozzle 24 threaded into the fibres pushes away the nozzle used and replaces said nozzle in the holder. The rolls 11, 12 rotate at creeping speed feeding the fibres through the press head 7. The grease pump is started, whereby the grease flow starts to pull the fibre ends. The rolls 11, 12 are accelerated in accordance with a pre-programmed curve so that the tension of the tube starts to increase. The rolls 11, 12 and the control tubes 9, 10 are opened when the tension of the tube 8 exceeds the tension of the fibres. When the tension of the tube exceeds the tension of the fibres, the direction of the measured tension changes. The opening can be programmed also to take place when the tube tension reaches a pre-set value. Finally the rolls 11, 12 come to a stop and the feed unit returns to the preparatory position.

The above-described embodiment is not intended to restrict the invention in any way but the invention can be modified freely within the scope of the claims. It is therefore apparent that the arrangement according to the invention or the details thereof does not necessarily have to be of the kind as those described in the Figures, but different kinds of details are also possible. As shown above, the invention is by no means restricted to the secondary coating of optical fibres but the invention can be applied to coating fibres in general. It should also be noted that the invention can be applied in connection with other thin flexible elongated products. In the example shown in the Figures, the feed unit is formed as a unit that moves on rails etc. This is, however, not the only possibility but the feed unit can also be formed for instance of two beam parts, whereby one beam part forms a pillar that is fastened in position on the base, on which the second beam part is fastened in a horizontal position and arranged to move vertically in relation to the pillar. The rolls and other elements are in turn fastened horizontally to the unit mounted in the beam part that is arranged to move along the horizontal beam part etc.

The invention claimed is:

1. A method in a coating line for a fibre-like product or fibre-like products, especially for an optical fibre or optical fibres, in which the fibre-like product and products are directed from output means to a press head, by means of which a tube is formed around the fibre-like product or the fibre-like products, characterized in that the fibre-like product or the fibre-like products are directed from the coating line functioning in the coating process of a previous product or products to a feed unit in a preparatory position at the side, when the coating process of the previous product or products has terminated the feed unit is shifted to the coating line and the fibre-like product or the fibre-like products are fed into the press head and are accelerated to the speed of the tube by means of the feed unit, and the feed unit is detached from the fibre-like product or the fibre-like products, when measurement parameters associated with the fibre-like product or the fibre-like products and/or the tube reach the predetermined values and are shifted back to the preparatory position at the side of the coating line.

2. A method as claimed in claim 1, characterized in that the fibre-like product or the fibre-like products are fed into the press head using a motor-driven roller device in the feed unit.

3. A method as claimed in claim 1, characterized in that the feed unit is detached from the fibre-like product or the fibre-like products when a predetermined length of the fibre-like product or the fibre-like products has been fed into the tube.

4. A method as claimed in claim 1, characterized in that the feed unit is detached from the fibre-like product or the fibre-like products when the tension of the tube exceeds the predetermined value.

5. A method as claimed in claim 4, characterized in that the feed unit is detached from the fibre-like product or the fibre-like products when the tension of the tube exceeds the tension of the fibre-like product or the fibre-like products.

6. An arrangement in a coating line for a fibre-like product or fibre-like products, especially for an optical fibre or optical fibres, in which the fibre-like product and products are directed from output means to a press head, by means of which a tube is formed around the fibre-like product or fibre-like products, characterized in that the arrangement comprises a feed unit provided with a motor-driven roller device and a guide nozzle for the fibre-like product or the fibre-like products arranged to shift from a preparatory position at the side of the coating line to a feeding position on the coating line and back to feed the fibre-like product or the fibre-like products into the press head after the termination of the previous coating process, and measuring means for measuring measurement parameters associated with the fibre-like product or the fibre-like products to control the feed unit.

7. An arrangement as claimed in claim 6, characterized in that the measuring means comprise means for measuring the length of the fibre-like product or the fibre-like products fed into the tube.

8. An arrangement as claimed in claim 6, characterized in that the measuring means comprise means for measuring the tension of the tube.

9. An arrangement as claimed in claim 8, characterized in that the measuring means comprise means for measuring the tension of the fibre-like product or the fibre-like products and means for comparing the tension of the tube and the tension of the fibre-like product or the fibre-like products.

10. An arrangement as claimed in claim 6, characterized in that the guide nozzle in the feed unit into which the fibre-like product or the fibre-like products are threaded is arranged to push the guide nozzle used in the previous coating process from the position thereof and to replace said guide nozzle when the feed unit shifts from the preparatory position to the feeding position.

11. A method as claimed in claim 2, characterized in that the feed unit is detached from the fibre-like product or the fibre-like products when a predetermined length of the fibre-like product or the fibre-like products has been fed into the tube.

12. A method as claimed in claim 2, characterized in that the feed unit is detached from the fibre-like product or the fibre-like products when the tension of the tube exceeds the predetermined value.

* * * * *